April 9, 1957  E. H. EPPRECHT  2,788,380
THERMOCOUPLE ASSEMBLY FOR FLUID LINES
Filed July 28, 1954  2 Sheets-Sheet 1

INVENTOR.
EDWARD H. EPPRECHT
BY Herman L. Gordon
ATTORNEY

April 9, 1957 E. H. EPPRECHT 2,788,380
THERMOCOUPLE ASSEMBLY FOR FLUID LINES
Filed July 28, 1954 2 Sheets-Sheet 2

INVENTOR.
EDWARD H. EPPRECHT
BY Herman L. Gordon
ATTORNEY

United States Patent Office 2,788,380
Patented Apr. 9, 1957

2,788,380

THERMOCOUPLE ASSEMBLY FOR FLUID LINES

Edward H. Epprecht, Takoma Park, Md., assignor to American Instrument Company, Inc., Silver Spring, Md.

Application July 28, 1954, Serial No. 446,286

6 Claims. (Cl. 136—4)

This invention relates to thermocouples, and more particularly to a thermocouple assembly for use in a high pressure fluid line.

A main object of the invention is to provide a novel and improved thermocouple assembly for use in a high pressure fluid line, said assembly being simple in construction, involving only a few parts, and being provided with means for at times sealing the thermocouple thereof from the fluid line, so that said thermocouple may be easily removed for inspection, repair, or replacement without necessitating the shutting down of the fluid line or the pressure equipment associated therewith.

A further object of the invention is to provide an improved thermocouple assembly for a high pressure line, said assembly involving inexpensive components, being easy to install, and being durable in construction.

Further objects and advantages of the invention will become apparent from the following description and claims, and from the accompanying drawings, wherein:

Figure 1:
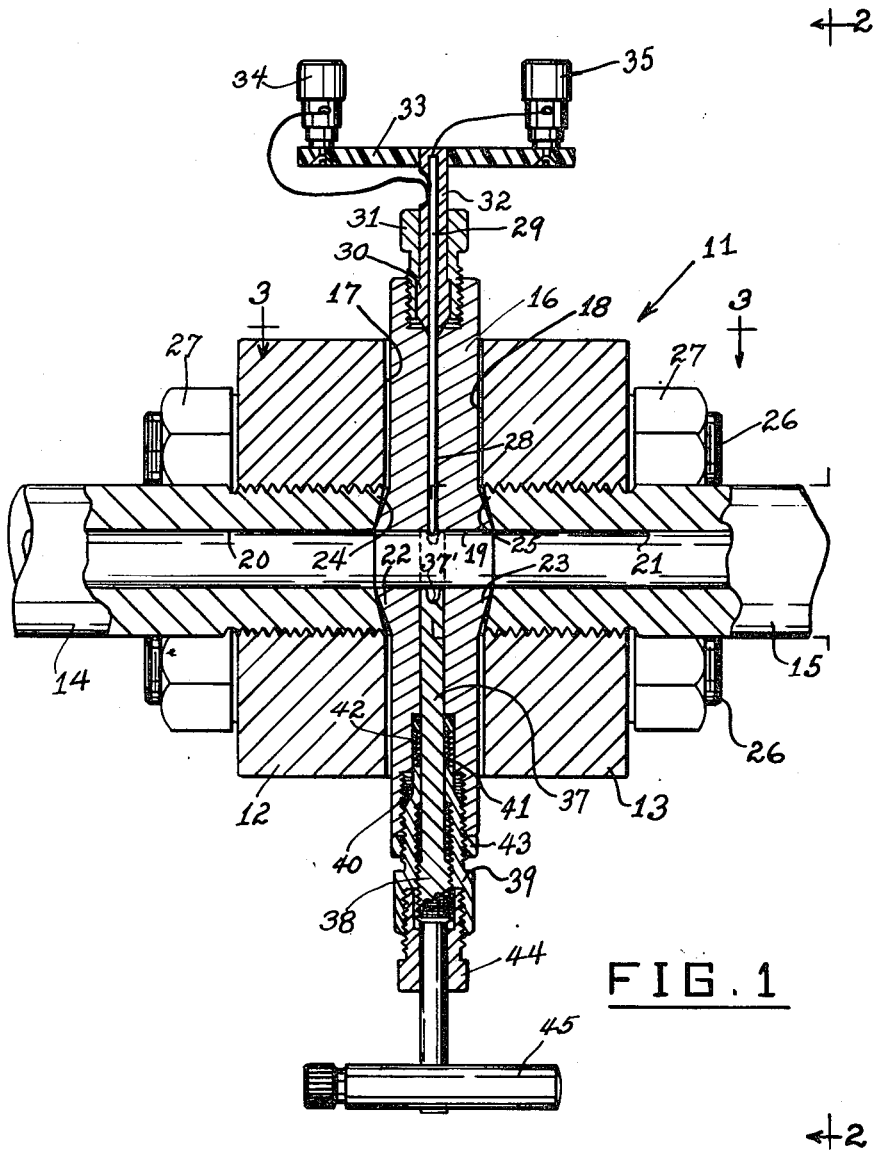
Figure 1 is a vertical cross-sectional view taken through an improved thermocouple assembly constructed in accordance with the present invention, shown installed in a high pressure fluid line.
Figure 2:
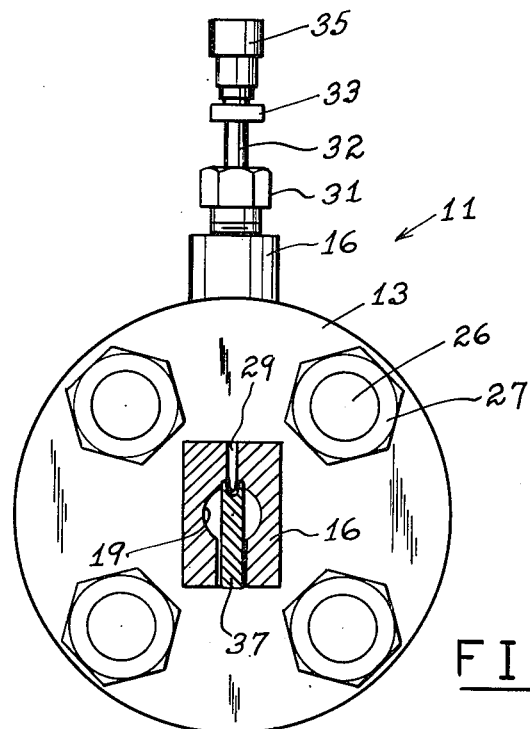
Figure 2 is a cross-sectional view taken on the line 2—2 of Figure 1, with the thermocouple shield rod shown in sealing position relative to the thermocouple.
Figure 3:
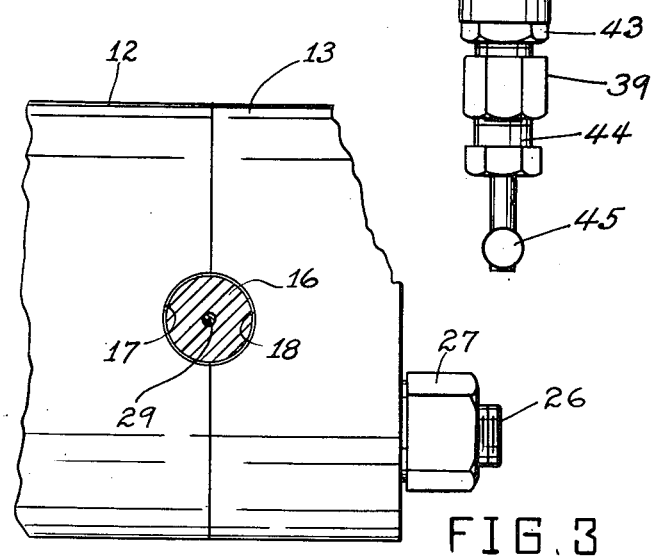
Figure 3 is a cross-sectional view taken on the line 3—3 of Figure 2.

Referring to the drawings, the improved thermocouple assembly is designated generally at 11. Said assembly comprises the mating cylindrical block members 12 and 13, the block member 12 being adapted to be threadedly engaged on the end of a first conduit section 14 of a fluid pressure line, and the block member 13 being adapted to be threadedly engaged on the mating end of a second conduit section 15 of the line, as shown in Figure 1. Designated at 16 is a generally cylindrical body member received in mating semi-cylindrical transverse recesses 17, 18, provided in the opposing surfaces of the block members 12 and 13, the body 16 being formed with the transverse bore 19 registering with the bores 20 and 21 of the conduit sections 14 and 15.

Body 16 is provided with generally conical seat portions 22, 23 around the ends of bore 19, sealingly engageable with respective conical seats 24 and 25 formed in the ends of the mating conduit sections 14 and 15. A plurality of fastening studs 26 extend through the block members 12 and 13 on opposite sides of the body 16, said studs being provided with nuts 27 threaded on their end portions to sealingly clamp the body 16 between said block members, as shown in Figure 1.

The upper portion of body 16, as viewed in Figure 1, is formed with an axial bore 28 in which is positioned the thermocouple 29. As shown, the end of thermocouple 29 normally projects slightly into bore 19, whereby the thermocouple can respond to the temperature of the fluid in the conduit sections 14 and 15.

The upper portion of thermocouple 29 extends through a sealing gland 30 which is locked in the position thereof shown in Figure 1 by a gland nut 31 threadedly engaged in the top of body 16. When it is desired to remove the thermocouple 29 for inspection, repair, or replacement, the gland nut 31 is unscrewed, allowing the thermocouple to be withdrawn from body 16.

Secured to the top end of the inner gland sleeve 32 is the terminal strip 33 on which are mounted the thermocouple terminal posts 34 and 35, as shown.

Thermocouple 29 is conventional in construction and may be a thermocouple of the coaxial type. The top portion of the gland sleeve 32 is cut away, as shown, so that one of the lead wires of the thermocouple may pass through the gland sleeve opening thus formed and may be connected to terminal post 34, as shown. The other lead wire passes through the top of the gland sleeve and is connected to terminal post 35.

Designated at 37 is an axially extending shield rod slidably mounted in the lower portion of body 16, as viewed in Figure 1. Shield rod 37 is aligned with thermocouple 29 and is formed at its end with the cup-like recess 37' which is adapted to receive the end of thermocouple 29 when the shield rod is moved into the dotted view position thereof shown in Figure 1.

Shield rod 37 is provided with a threaded portion 38 which is engaged with internal threads in a gland bushing 39. Bushing 39 is threadedly engaged with internal threads 40 in the lower end of body 16, the upper end of said bushing engaging against gland packing 41 contained in a sealing gland recess 42 provided in body 16 around shield rod 37. A locknut 43 is provided on the external threads of bushing 39 to lock the bushing in sealing position.

Designated at 44 is a further bushing member through which the lower portion of rod 37 rotatably and slidably extends, the bushing member 44 being threadedly engaged in the lower portion of bushing 39, as shown in Figure 1.

A transverse handle bar 45 is secured to the external end of rod 37.

The rod 37 is operated in the manner of a conventional valve, whereby the recessed inner end of the rod 37 may be advanced transversely across bore 19 to sealingly engage with the opposite wall portion of said bore around the end of the thermocouple 29, whereby the bore 28 is sealed with respect to bore 19, and whereby the thermocouple 29 may be removed whenever necessary without the necessity of shutting down the fluid pressure system connected to the conduit line containing the sections 14 and 15.

Normal operation of the thermocouple assembly may be resumed by retracting the shield rod 37 to the normal position thereof shown in full line view in Figure 1.

While a specific embodiment of an improved thermocouple assembly for use in a fluid line have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A thermocouple assembly comprising housing means adapted to be connected between a pair of conduit sections, said housing means having an internal cavity adapted to communicate with the bores of such conduit sections, a thermocouple removably secured in a wall portion of said housing means and having an end portion exposed to said cavity, and a shield element movably secured in said housing means opposite said thermocouple and being movable into sealing engagement with the internal surface of said wall portion around the end of said thermocouple.

2. A thermocouple assembly comprising a housing adapted to be connected between a pair of conduit sections, said housing having an internal cavity adapted to communicate with the bores of such conduit sections, a thermocouple removably secured in a wall portion of said housing and projecting into said cavity, and a shield element movably secured in said housing opposite said thermocouple and being movable into sealing engagement with said wall portion around the end of said thermocouple, said shield element having a recess in its end adapted to receive the end of the thermocouple.

3. A thermocouple assembly comprising a housing adapted to be connected between a pair of conduit sections, a transverse body member secured in said housing and having a bore adapted to register with the bores of such conduit sections, a thermocouple secured in one end of said body member and projecting into the bore thereof, and a shield element movably secured in the opposite end of said body member in alignment with said thermocouple and being movable into sealing engagement with the internal surface of the wall portion of said first-named bore around the end of said thermocouple.

4. A thermocouple assembly comprising a housing adapted to be connected between a pair of conduit sections, a transverse body member secured in said housing and having a bore adapted to register with the bores of such conduit sections, a thermocouple secured in one end of said body member and projecting into the bore thereof, and a shield element movably secured in the opposite end of said body member in alignment with said thermocouple and being movable into sealing engagement with the wall portion of said first-named bore around the end of said thermocouple, said shield element having a recess in its end adapted to receive the end of the thermocouple.

5. A thermocouple assembly comprising a housing adapted to be connected between a pair of conduit sections, a transverse body member secured in said housing and having a bore adapted to register with the bores of such conduit sections, a thermocouple secured in one end of said body member and projecting into the bore thereof, gland means in the end of said body member sealing said thermocouple with respect to said body member, a shield element movably secured in one end of said body member in alignment with said thermocouple and being movable into sealing engagement with the wall portion of said first-named bore around the end of said thermocouple, and additional gland means in said body member sealing said shield element with respect to said body member, said shield element having a recess in its end adapted to receive the end of the thermocouple.

6. A thermocouple assembly comprising housing means adapted to be connected between a pair of conduit sections, said housing means having an internal cavity adapted to communicate with the bores of such conduit sections, a thermocouple removably secured in a wall portion of said housing means and having an end portion exposed to said cavity, a shield element movably positioned in said housing means opposite said thermocouple, said shield element being normally spaced from said wall portion but being supported for movement into sealing engagement with said wall portion around the end of said thermocouple, and manually operated means mounted in said housing means and projecting externally thereof, said manually operated means being arranged for at times moving said shield element into sealing engagement with said wall portion.

References Cited in the file of this patent

UNITED STATES PATENTS

| | | |
|---|---|---|
| 1,978,992 | Donnelly | Oct. 30, 1934 |
| 2,025,015 | Byrns | Dec. 17, 1935 |